UNITED STATES PATENT OFFICE.

EDWARD WILKINS, OF CHESTERTOWN, MARYLAND.

IMPROVEMENT IN INSECT-DESTROYING COMPOUNDS.

Specification forming part of Letters Patent No. 165,289, dated July 6, 1875; application filed January 21, 1875.

*To all whom it may concern:*

Be it known that I, EDWARD WILKINS, of Chestertown, in the county of Kent and State of Maryland, have invented a new and useful Improvement in Compounds for Destroying Insects which Prey on Peach-Trees and Grape-Vines, of which the following is a specification:

In many parts of this country the peach-trees have been destroyed by the action of aphididæ, producing the disease known as the "yellows." The same insect preys upon vineyards, and has caused much damage to the vines in this country and in France, where the disease is known as phyloxera.

I have ascertained by a long course of observations that the same insect operates upon both the vine and the peach-tree, and that it also appears in different relations, and that effects heretofore attributable to different causes have their common origin in the depredations of the same insect. They first appear upon the roots, feeding upon the tender portions of the bark, and destroying in this way the vitality of the tree. At stated intervals they come to the surface for purposes of procreation, and then the female deposits her eggs in the leaves and tender shoots, causing the leaves to turn yellow, curl up, and fall off, so that the young, when hatched from the egg, crawl into the earth and renew the course of generation, which runs through a cycle of five years.

From this recital it will appear that any attempt to destroy these insects will prove imperfect unless the attack is made against the insect in his three conditions.

I shall therefore include in this specification the manner in which I advise the use of my compound, as my own experience has brought me to the conclusion that this mode is effective for the purpose.

The compound I prefer to use for the purpose is made from substantially the following ingredients and proportions: Of chloride of sodium, (common salt,) one hundred parts; of hyposulphite of soda, five parts; of muriate of potash, ten parts, by weight, mixed and applied as hereinafter described.

In stating these proportions, however, I do not fix the proportions as essential, for it is obvious that more or less of either may be employed without essentially varying the action of the compound.

The muriate of potash is not used as an insecticide, but is a fertilizer, which is preferred because of its condensed form. Its utility arises from the diseased and weakened condition of the roots, requiring the stimulant of a fertilizer; and other fertilizing ingredients may be substituted for the muriate of potash, but I regard it as the best.

When the compound has been prepared, if a new orchard or vineyard is to be planted, I would dip the roots in a solution of one-fifth of one per cent. of carbolic acid in water, and soon after planting spread the compound, substantially as described, over the ground, applying two thousand pounds, more or less, to the acre, and plow it under.

Should an old orchard or vineyard require treatment, the same amount of the compound should be scattered over the ground and plowed under late in the fall.

When the aphididæ make their appearance on the leaves they should be syringed at intervals of ten or twelve days with a similar solution of carbolic acid.

When the greater part of the infected leaves have fallen the hereinbefore-described compound should be spread on the surface, using again about two thousand pounds to the acre, and allowed to remain there until gradually dissolved and absorbed.

By this means the orchard or vineyard can be preserved, and even if infected restored to a healthy state.

Without limiting myself to the proportions or amounts stated,

What I claim as my invention, and desire to secure by Letters Patent, is—

The compound of chloride of sodium and hyposulphite of soda for use as an insecticide, substantially as set forth.

In testimony whereof I have signed my name to this specification in the presence of two subscribing witnesses.

EDWD. WILKINS.

Witnesses:
  R. MASON,
  A. RUPPERT.